United States Patent [19]

Gummeringer

[11] 4,179,837

[45] Dec. 25, 1979

[54] ANIMAL TRAP

[76] Inventor: Henry E. Gummeringer, 8609 Lyndale Ave. South, Ste. 101A, Bloomington, Minn. 55420

[21] Appl. No.: 868,709

[22] Filed: Jan. 11, 1978

[51] Int. Cl.² .................................... H01M 23/34
[52] U.S. Cl. ............................................ 43/87
[58] Field of Search ............................ 43/87; 119/153

[56] References Cited

U.S. PATENT DOCUMENTS

| | | | |
|---|---|---|---|
| 1,567,214 | 12/1925 | Van Tassel | 43/87 |
| 1,860,378 | 5/1932 | Bailey | 43/87 |
| 2,479,196 | 8/1949 | Anderson | 43/87 |
| 2,700,844 | 2/1955 | Pastuck | 43/87 |
| 3,416,257 | 12/1968 | Dahlgren | 43/87 |

*Primary Examiner*—Robert C. Watson
*Attorney, Agent, or Firm*—Dorsey, Windhorst, Hannaford, Whitney & Halladay

[57] ABSTRACT

An improved animal trap of the snare type includes a snare housing having a connection for the snare end of the snare cable and adapted to slide on the main anchor portion of the snare cable. The self-tightening action of the snare, once an animal is caught in the snare loop, is supplemented by a settable and releasable spring member carried by the snare housing in combination with mechanism for operatively connecting the spring member to the snare cable for quick final tightening of the snare loop in response to release of the spring member. The trap includes a trigger device operatively connected to the spring member for releasing the spring and providing a quick final tightening of the snare loop as it finally closes on an animal. The snare housing may include an injection needle for injecting the animal with a lethal or other fluid. An auxiliary spring assembly is also provided to facilitate initial or preliminary closing of the snare loop on an animal to ensure the proper snare action as the animal tried to escape.

14 Claims, 11 Drawing Figures

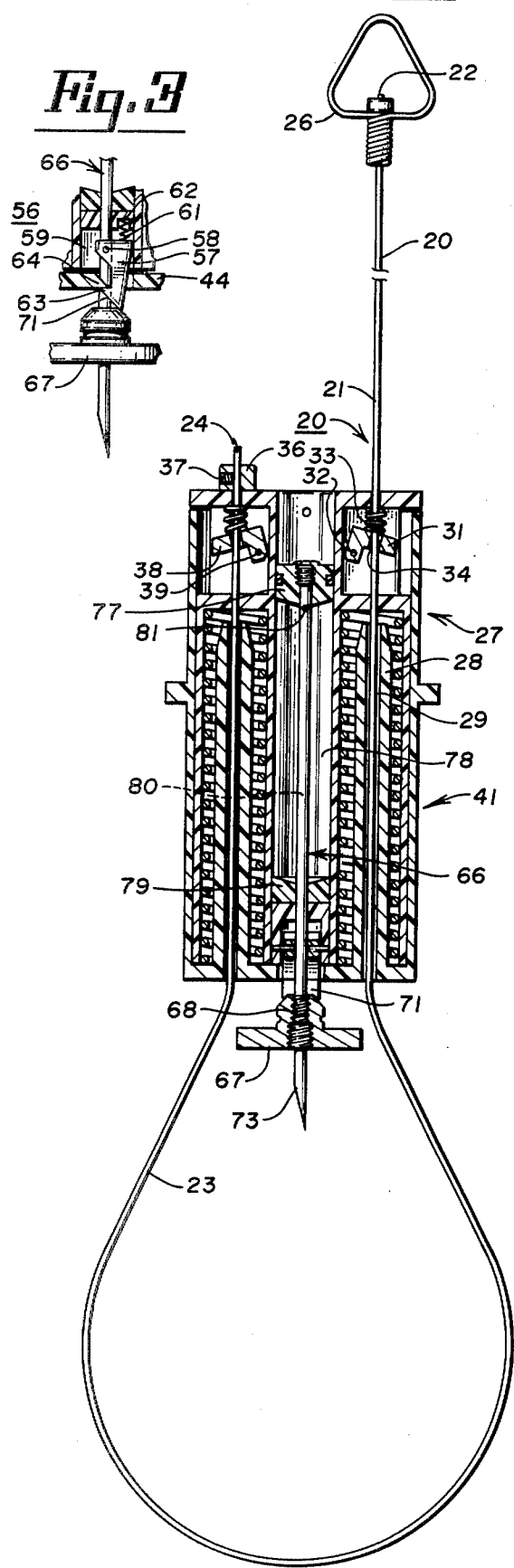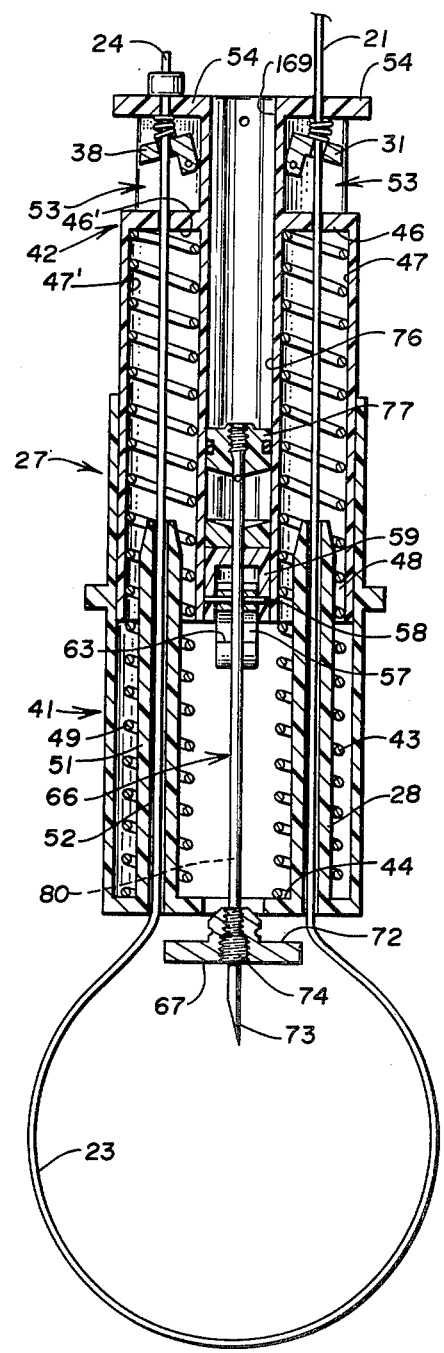

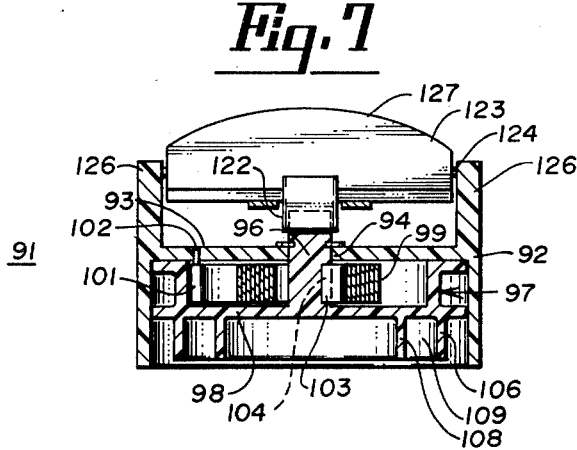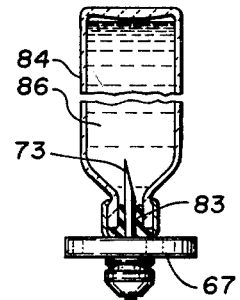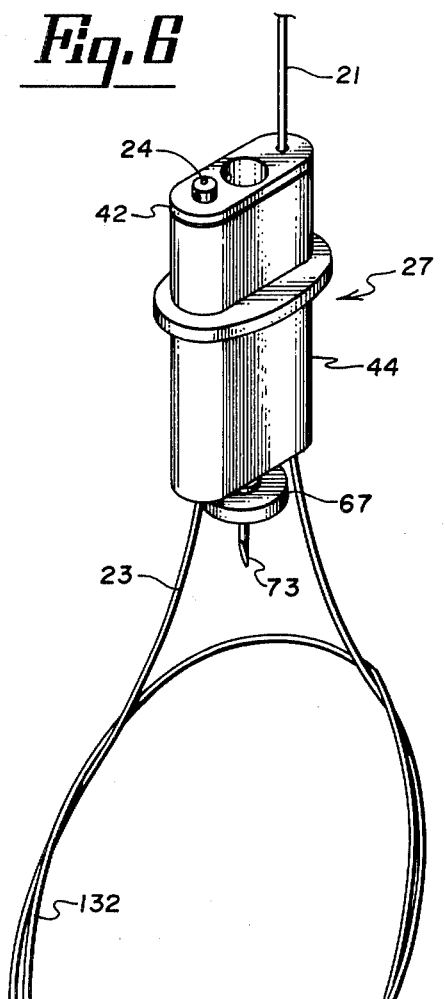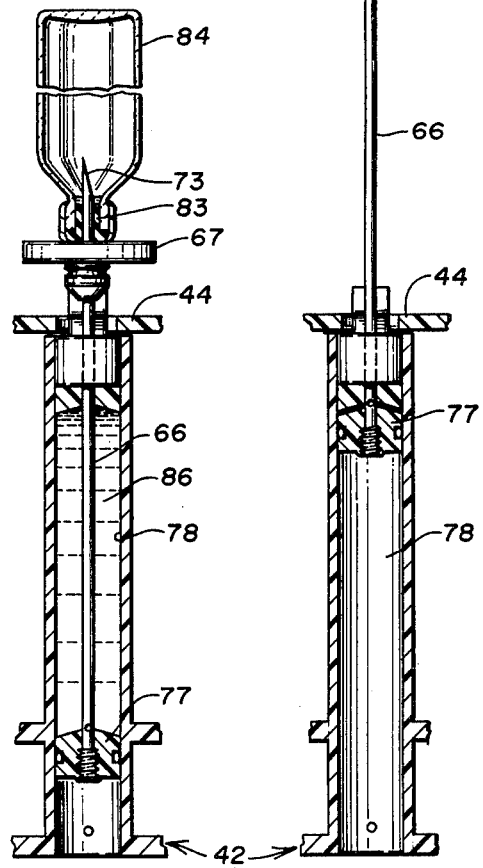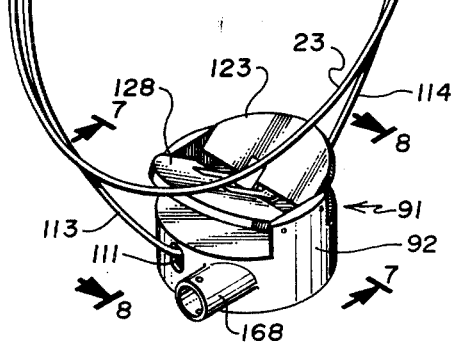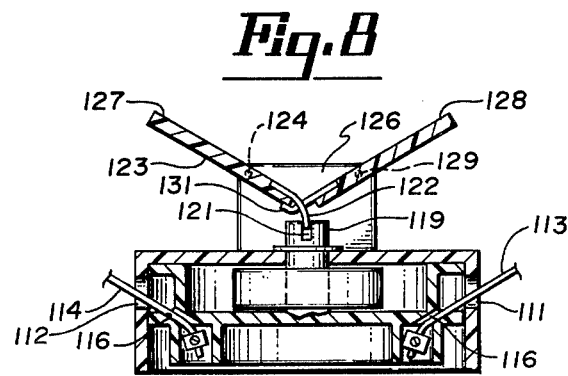

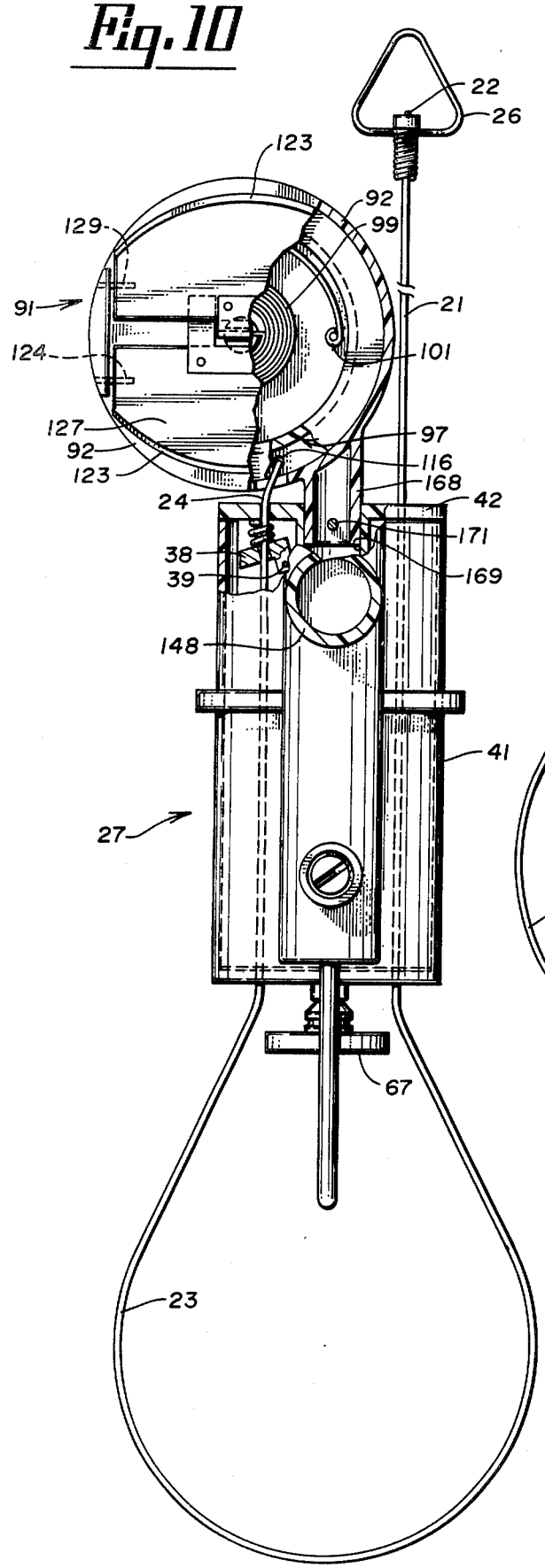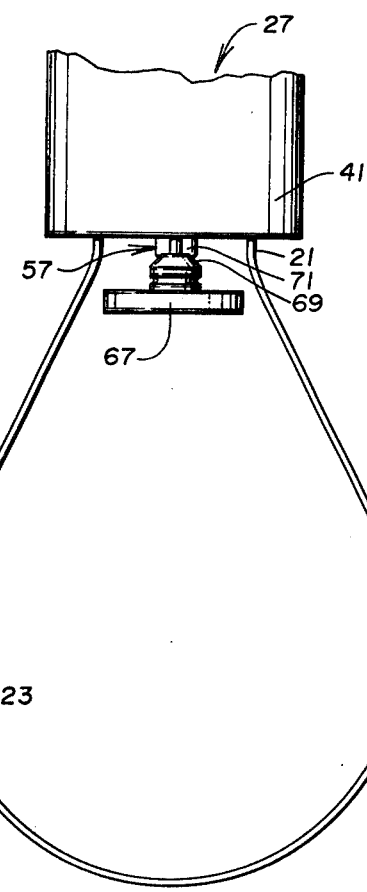

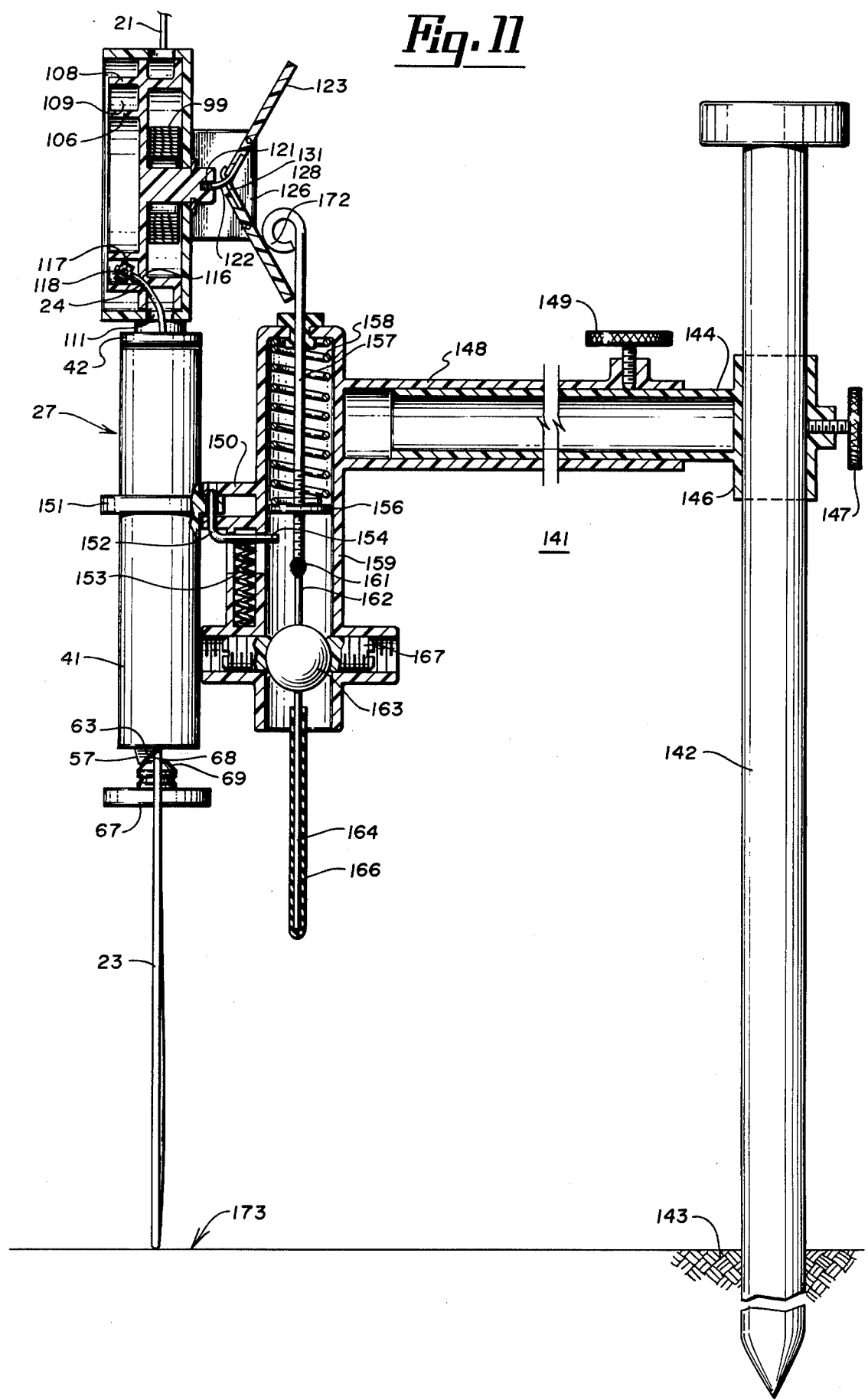

ANIMAL TRAP

BACKGROUND OF THE INVENTION

1. Field of the Invention

The invention involves the field of animal traps, and more particularly, traps of the type adapted to utilize a snare cable, one end of which has an anchoring portion, while the other end provides a snare portion and is formed into a snare loop with such other end sliding freely in at least one direction along the anchor portion of the snare cable.

2. Description of the Prior Art

Animal snares are known in which the snare cable provides a snare loop at one end, with the end of the snare cable at that end having a sliding connection of some type with the standing or anchor portion of the snare cable. Thus, if an animal becomes engaged within the snare and tries to escape, the sliding connection of the snare loop end to the anchor portion of the cable acts in the manner of a slipknot and gradually tightens the snare loop around the animal, as the animal tries to move away from the anchor portion of the cable which is normally secured to the ground or to some stationary object. One problem with such snares is that they depend essentially on the animal's own efforts to escape as a means of tightening the snare loop. Thus, although the snare loop may be tightened sufficiently to prevent the animal from escaping, it will ordinarily not be tightened sufficiently to kill the animal. Therefore, such snares have been considered as inhumane and merciless devices for trapping an animal.

Similar criticisms have been made with respect to other types of animal traps such as the spring jaw traps, which may engage only a foot or other portion of an animal, without effectively killing the animal.

In an effort to avoid such criticisms, some traps have been designed in which the engagement of an animal with a trigger causes a spring actuated member to pierce the animal or to provide a guillotine effect for the head of the animal. Such devices, however, do not operate on the normal self-tightening slip knot principle, but require that an animal move into a very special location and position, not only to engage the tripping device for such spring member, but also to be in position for engagement by the member as it is released. In effect, such devices are suitable primarily for use in the manner of preset or fixed traps, which have certain predetermined sizes for their holding portions, depending on the size of animal being trapped. Thus, such traps are not as adaptable to multiple use for different animals as is the case with known types of snares, in which the action of the animal helps to tightens the snare to whatever animal size is involved. The prior art known to applicant is exemplified by the following U.S. Pat. Nos.: 2,079,825, Urquhart; 2,168,132, Marshall; 2,224,474, Draggoo; 2,478,025, Taylor; 2,700,844, Pastuck; and 4,016,672, Joncas.

SUMMARY OF THE INVENTION

The present invention provides an improved animal trap which operates essentially on the snare principle for normal self-tightening of a snare loop in response to an animal's attempt to escape, in combination with mechanism incorporated in a snare housing which serves as the "slipknot" portion of the snare and which includes a settable and releasable spring member, mechanism for operatively connecting the spring member to the snare cable for quick tightening of the snare loop in response to release of the spring member, and a trigger device operatively connected to the spring member for releasing it as the normal self-tightening action of the snare brings the trigger device into contact with the animal. Specifically, the traveling snare housing of the improved animal trap includes a guide portion providing a guide passage for sliding connection of the snare housing to the anchor portion or standing portion of the snare cable, and the snare housing also has a connection for the second or free end of the snare cable and thereby provides a snare loop in the cable between the connection for such second end and the guide portion of the snare housing. The snare housing also includes a trigger device having a trigger member projecting toward the snare loop in a position to be engaged against the animal and to be pulled against the animal as the normal tightening of the snare closes the loop around the animal and brings the snare housing toward it.

In one form of the invention, the snare housing assembly includes a housing body member and a slide member relatively movable between preset and released positions, a spring member is connected between the slide member and body member and is compressed when the slide member is moved to preset position and normally urges the slide member from its preset toward its released position, the trigger device has a latch portion releasably holding the slide member in its preset position, and one of the housing body and slide members has a gripping member engaging the snare cable and causing quick final tightening of the snare loop in response to movement of the slide member to released position.

According to a further feature of the invention, the trigger device on such a snare housing may include a hollow needle at the trigger end adapted to press against the animal, and the needle is connected to a container or reservoir carried by some part of the snare housing, which is also provided with appropriate pumping mechanism to force the fluid from the reservoir through the needle and into the animal at the final tightening of the snare loop. The quick final tightening of the snare loop insures penetration of the injection needle into the animal for more merciful killing of the animal, if only a limb or paw of the animal has been caught in the snare loop.

The invention also contemplates the provision of an auxiliary spring assembly which can be combined with the snare housing and/or the snare loop in a manner to cause some preliminary tightening of the loop around a portion of an animal to a sufficient degree to ensure the further normal self-tightening action of the snare as the animal then tries to escape.

Other features, details of construction and advantages of the present invention will be apparent from the following detailed description of the preferred embodiments.

BRIEF DESCRIPTION OF THE DRAWINGS

In the drawings which form a part of this application and in which like reference numerals indicate like parts, FIG. 1 is a view of a snare trap according to the present invention with portions of the snare housing cut away or shown in section for convenient understanding of the construction, and with the parts in the snare housing shown in preset or compressed position;

FIG. 2 is a view similar to FIG. 1, showing the relative position of the snare housing parts and snare cable in released position;

FIG. 3 is a partial view on the line 3—3 of FIG. 1 showing details of the latch and latch release portions of the trigger device;

FIG. 4 is a partial view of the device of FIGS. 1 and 2, showing the manner in which a needle on the trigger device may be inserted in a supply container of injection fluid, when the parts are in the relative position of FIG. 2;

FIG. 5 is a view similar to FIG. 4, showing the manner in which the injection fluid is transferred into a fluid container within the snare housing, as the snare housing parts are moved to their preset position of FIG. 1;

FIG. 6 is a perspective view of the device of FIGS. 1-3, showing an auxiliary spring assembly and one manner in which such auxiliary spring assembly may be combined with such snare;

FIG. 7 is a partial sectional view of the auxiliary spring assembly, taken on the line 7—7 of FIG. 6;

FIG. 8 is a partial sectional view of the auxiliary spring assembly, taken on the line 8—8 of FIG. 6;

FIG. 9 is a partial view of the snare trap of FIGS. 1-3, showing an alternate construction for the animal-engaging end of the trigger device for use when no fluid injection is contemplated;

FIG. 10 is a view with certain portions broken away and other portions shown in section, showing another manner in which the auxiliary spring assembly can be combined with the snare housing, and in which the snare housing may be releasably mounted on a supporting unit so that the snare portion will hang below the snare housing and across a presumed animal ground path; and FIG. 11 is a side elevation at right angles to FIG. 10, showing further details of the connection between the snare and the supporting unit, together with details of the manner in which an actuating arm on the supporting unit can release the tripping element of the auxiliary spring assembly and also cause release of the snare housing from the supporting unit for normal self-tightening action of the snare after an animal has engaged the movable actuating arm of the supporting unit.

DESCRIPTION OF THE PREFERRED EMBODIMENTS

A preferred embodiment of the invention is shown in FIGS. 1-3 and is adapted to utilize a snare cable 20, which has an anchor portion 21 toward its first end 22, and a snare portion 23 near its second end 24. An anchor loop 26 is secured at the first end 22 and provides a means for attaching the first or anchor end of the snare cable to a suitable fixed object which will retain the snare and prevent the escape of an animal which becomes trapped therein. The trap includes a snare housing assembly 27 which is adapted to serve as a "slipknot" secured to the second end 24 of the snare cable and which is relatively slidable along the anchor portion 21 of the snare cable. For this purpose, the snare housing includes a guide portion 28 having a guide passage 29 extending longitudinally therein, and the snare cable portion 21 is guided within passage 29 for relative sliding movement of the snare housing along the cable. The snare housing includes a connecting or gripping member for engaging the snare cable and preventing relative movement thereof in a direction which would tend to open the snare loop. For this purpose, the gripping member 31 is pivoted at 32 to a portion of the snare housing and is urged in a clockwise position, as viewed in FIGS. 1 and 2, by a spring 33. A passage 34 through the pivoted member 31 permits relative sliding movement of the snare housing 27 in a direction downwardly along the anchor portion 21 of the snare cable to tighten the snare loop portion 23. Spring 33 and the interengagement of the edges of passageway 34 with the snare cable effectively prevent relative upward movement of the snare housing along the anchor portion, so that the snare loop can be progressively tightened around an animal, for example, by the normal tightening action caused as the animal caught within the loop tries to move away from the location in which it was caught and thus tends to pull the snare housing and snare portion of the cable away from the anchored end 22. The snare housing can, however, be reset toward the anchor end of the cable by releasing the gripping member 31 manually when the snare housing parts are in the relative position shown in FIG. 2.

The snare housing assembly 27 also has a connection for the second end of the cable as shown at 36. The snare portion 23 is extended up through the snare housing assembly as shown, and the second end 24 of the snare cable is secured within a locking nut member 36 by a setscrew 37. Lock nut 36 alone can hold the second end of the snare cable against relative snare opening motion in the housing assembly. For purposes to be further described, the snare assembly is also preferably provided with a further gripping member or one-way clutch 38 pivoted at 39 to a portion of the assembly for operation in the same manner as the gripping member 31 for the anchor portion of the cable. Member 38 and its passageway, pivot and spring also are arranged in such a manner that they would prevent relative downward movement of the end portion 24 in a direction which would disconnect that end from the snare housing and thus enlarge the snare loop. At the same time, however, member 38 would permit upward relative movement of the cable end 24, either lock nut 38 or cable end 24 is selectively connected to utilize such upward movement for the further purpose to be described.

As shown in FIGS. 1 and 2, the preferred construction of the snare housing assembly 27 includes a housing body member 41 and a slide member 42 which are relatively slidable with respect to each other along a longitudinal path generally parallel to the snare cable anchor portion. A spring 43 is supported around the guide portion 28 which projects upwardly from the base 44 of the housing body member 41. Thus the spring can be compressed between the bottom wall 44 and a cross wall or ledge 46 of slide member 42. The upper end of the spring is held within an external tubular section 47 of slide member 42 which has an internal diameter greater than the external diameter of the guide post 28, thereby providing an annular spring chamber 48 between these two parts. The relative longitudinal sliding movement of the slide member 42 with respect to the housing body member 41 thus provides a preset or compressed position for spring member 43 when the parts are in the position of FIG. 1, and the spring normally urges the parts to the released position shown in FIG. 2. Such words as "relative movement" and "relatively slidable" are used herein to describe the functions and relative movements of certain elements with respect to each other and without limitation as to whether one such element or another or all of such elements might be thought of as fixed or stationary in an absolute sense or by comparison to some other frame of reference.

To provide additional spring force and a more effective tightening action for the snare loop, a second spring 49 is similarly positioned over a guide portion 51 projecting up from the bottom wall 44 of the snare housing body member 41 parallel to the guide portion 28. Guide passage 52 within guide portion 51 guides the free end of the snare portion of the cable upwardly through the snare housing assembly toward its connections at 36 and 38. As more clearly shown in FIG. 2, these connections are at the upper end of the slide member 42 above the cross wall 46' which engages the upper end of spring 49 as such upper end is held within the tubular section 47' of the slide member, corresponding to section 47 for spring 43. Hence all of the gripping members or connections between the snare housing assembly and the snare cable are supported in this particular embodiment at the end of the relatively movably slide member, and the slide member is thus prevented from relative upward movement along either of the cable portions. Thus, when the slide member and housing body member move relatively to each other from the preset position of FIG. 1 to the released position of FIG. 2, the net effect is to force the housing body member 41 downwardly toward an animal within the snare loop portion 23 and at the same time effectively tighten the snare loop so that its circumference is decreased by a total amount representing twice the distance of relative movement between the slide member and housing body member.

The one-way gripping members are positioned at the end of slide 42 which projects away from housing body 41 and the snare loop, when the parts are in the released position of FIG. 2. The slide walls provide external openings 53 at the slide end wall 54, for convenient manual access to release the one-way grip members and reset the snare cable when the parts are to be reset from the position of FIG. 2 to that of FIG. 3.

To retain the snare housing assembly parts in the preset position of FIG. 1, and to provide for the release of the parts for movement to the released position of FIG. 2, a trigger device assembly indicated generally at 56 in FIG. 3 includes a latch portion 57 having two parallel supporting arms pivoted on shafts 58 carried in supporting wall 59 of the slide member 42. A spring 61 compressed between the upper edge of latch 57 and a supporting recess 62 in the slide member normally urges the latch 57 in a clockwise direction as seen in FIG. 3 to hold its latching hook 63 in engagement beneath the latching edge 64 in the bottom wall 44 of the snare housing body member 41. Thus, latch portion 63 prevents relative upward movement of the slide member from the position of FIG. 1 to the position of FIG. 2, as long as the latch 57 remains in the position shown in FIG. 3. The latch is released by a trigger member 66 which extends longitudinally of the snare housing assembly and is supported for limited longitudinal sliding movement within the snare housing assembly. Trigger member 66 has a trigger end 67 extending below the snare housing assembly in position for engagement by an animal caught within the snare loop. The trigger end is threaded at 68 onto the lower end of the trigger member 66. The trigger and latch include interengaging cam portions designed to release the latch hook 63 when the trigger end 67 moves relatively upwardly toward the housing assembly 27. The interengaging cam portions include a conical cam surface 69 on the trigger end member 67 and an inclined cam surface 71 at the lower end of latch member 57. Thus, relative upward movement of the trigger end 67 will rock latch member 57 to retract locking hook 63 from the edge 64 of the housing body bottom wall 44. At that point, the compressed spring members 43 and 49 will cause rapid and forceful relative movement of the snare housing assembly parts from the position of FIG. 1 to that of FIG. 2 for the purpose already described. At the same time, the relative upward movement of trigger member 66 will be limited by engagement of either cam portion 69 or the edge 72 of the trigger end member against the bottom wall 44 of the snare housing body.

According to a further feature of the invention, the trigger end is provided with a hollow needle 73 which is adapted to inject the trapped animal with a suitable injection fluid. Needle 73 is removably threaded at 74 into the trigger end member 72, and may thus be selectively used or removed, as desired in a particular case. To provide the injection liquid, the snare housing assembly has a fluid container portion connected to the needle. While this container portion can conceivably be supported on any one of the housing body, slide and trigger members, it is illustrated in FIGS. 1 and 2 as a tubular container portion 76 extending longitudinally at the center of the slide coaxially with the trigger member 66. The fluid container portion 76 has a uniform circular cross section, and the trigger member 66 has a plunger 77 at its upper end which fits within container portion 76 and thus provides a suitable injection fluid chamber or reservoir portion 78 in the space between plunger 77 and a resilient bottom sealing member 79 through which trigger member 66 projects from the plunger to the bottom of the assembly. This fluid chamber 78 will have its maximum volume when the parts are in the position of FIG. 1 and its minimum volume when the parts are in the position of FIG. 2. The injection fluid is conveyed from fluid chamber 78 to the needle 73 by a fluid passage within trigger member 66 which has an inlet opening 81 adjacent plunger 77. Hence, there is a constantly open passageway through the trigger member from opening 81 within fluid chamber 78 to the hollow needle 73 on the trigger end 67. The relative location and arrangement of these parts thus provides a pumping mechanism which effectively forces injection fluid from the chamber 78 through the needle 73 when the spring member of the snare housing assembly moves from its preset compressed position to its expanded released position. The hollow needle is located and directed as an extension of the trigger member, so that it will penetrate the skin of an animal which is being forced against the trigger end and snare housing assembly by the tightening of the snare loop. Thus, the desired fluid will be injected into the animal during the sudden final tightening of the snare loop. The injection needle could also be mounted on the snare housing assembly separately from the trigger member.

As shown in FIGS. 4 and 5, the construction of the fluid chamber, pumping mechanism and needle provide a convenient method for filling the chamber with the desired injection fluid. Thus, when the snare housing assembly parts are in the relative position of FIG. 2, the injection needle 73 can be inserted through the resilient stopper 83 of a supply container 84. As the snare housing assembly parts are then manually compressed from the position of FIG. 2 to the position of FIG. 1, the fluid 86 in container 84 can be sucked into the fluid chamber 78 by the pumping action of plunger 77 and the relative movement thereof which gradually increases the volume of the chamber portion 78. The construction of these pumping mechanism and fluid chamber parts has the further advantage that the relative location of the fluid passageway opening 81 adjacent plunger 77 will be at the top of the chamber 78, whenever the snare housing assembly is supported in a vertical position. Thus, any tendency of the injection fluid to leak from the fluid chamber 78 to the needle 73 would be prevented as long as the opening 81 remains essentially at the top of the chamber 78.

FIGS. 6, 7 and 8 illustrate a further feature of the invention which involves the provision of an auxiliary spring assembly 91 and one method of utilizing it in connection with the improved animal trap snare arrangement of FIGS. 1-3. The auxiliary spring assembly 91 includes a casing or cylindrical housing 92. As shown in FIG. 7, this housing portion 92 has a transverse wall 93 with a central bearing opening 94 in which the shaft 96 of a rotatable winding drum 97 is supported. The winding drum has a bottom wall 98 parallel to and spaced from the housing wall 93. Within the cylindrical intermediate space between these walls, a spring 99 is coiled around the shaft 96. The outer end 101 of the spring is secured at 102 to the housing wall 93. The inner end of the spring is secured at 103 to the shaft 96, for example, by a key slot 104. Thus, the spring can be coiled into compressed form as shown in FIG. 7 by appropriate rotation of the winding drum 97 in one direction. When released, the spring will then rotate the winding drum in the opposite direction to provide a desired winding function. The winding drum has depending annular outer projection 106 and inner projection 108 which provide an annular space 109 betweem them below the spring chamber. (See also FIG. 11.)

As shown in FIG. 8, the cylindrical housing 92 has diametrically opposite openings 111 and 112 through which the respective ends 113 and 114 of an auxiliary cable 132 can be inserted to engage the winding drum area 97. These auxiliary cable ends are secured in desired fashion to the winding drum and preferably in a removable fashion to permit alternate uses of the auxiliary spring assembly. Thus, the cable ends 113 and 114 can be inserted (when the parts are in the position of FIG. 8) through the outer openings 111 and 112, and through slots 116 in the rim of the winding drum. These ends may then be further secured, if needed, within the winding drum by providing a suitable lock washer 117 with a setscrew 118 to hold the auxiliary cable ends within the annular area 109 of the winding drum, in the same manner shown for the snare cable end in FIG. 11.

The winding drum is held in its tensioned position, with spring 99 fully wound and compressed, by means of a suitable latching slot 121 in the upwardly projecting end 119 of the winding drum shaft 96. This latching slot 121 is engaged by the latch element 122 of a latching plate 123 pivoted at 124 on a cross shaft carried by the upwardly extending projections 126 of the housing 92. Member 123 is in the form of a plate which serves as a movable tripping element extending over roughly half of the area above housing 92. Thus, the upper surface 127 of tripping element 123 provides a relatively substantial area for possible engagement by the foot of an animal or for engagement by some other trigger device as subsequently described herein. To increase the effective area of the tripping element, a further member 128, similar to plate 123 is pivoted at 129 on a cross shaft similar to 124. Element 128 includes an extension 131 which projects beneath the inner edge of tripping element 123 as shown in FIG. 8. Thus, a downward pressure on tripping element 128 would also effectively lift the latch portion 122 of tripping element 123 out of the locking slot 121 and thus release the spring 99.

When such spring 99 is released, the drum 97 rotates rapidly and winds the two ends 113 and 114 of the auxiliary cable 132 thereon, thus effectively shortening the circumference of the main loop portion provided by such cable between these two ends. As shown in FIG. 6, the loop portion of this auxiliary cable 132 is intertwined with the snare loop 23 of the device of FIGS. 1-3. One purpose of this arrangement is to provide a way of hanging the snare loop across a presumed animal path and using the tripping elements of the auxiliary spring assembly to trigger the operation of the auxiliary assembly and make sure that an animal crossing said path within the snare loop 23 is actually engaged within the snare loop. In effect, when the animal steps on the auxiliary element, its cable 132 will be tightened to decrease substantially the effective size of the combined snare loop around the animal and will thus ensure that the animal has sufficient engagement with the main snare loop 23 to start the normal self-tightening action of the snare trap as the animal tries to escape. The animal will thus pull snare housing assembly 27 along the anchor portion 21 of the main snare cable until the animal effectively causes a self-tightening of the snare loop 23 to force the trigger end 67 and/or needle 73 into firm enough engagement with the animal to cause relative movement of the trigger, release of the latch and the violent final tightening of snare cable 23 as the parts move from the previously described position of FIG. 1 to that of FIG. 2.

As shown in FIG. 9, the trap of the present invention can selectively be used without any injection needle of the type illustrated in the previous figures, by merely removing the threaded needle 73 from the trigger end member 67. Thus, as an animal is caught within the snare loop portion 23 illustrated in FIG. 9, and as its effort to escape gradually slides the snare housing assembly 27 down along the anchor portion 21 of the snare cable, a point will be reached at which the animal's own actions cause the trigger end 67 to press against the animal. The trigger end cam portion 69 will then engage the cam surface 71 of the latch member 57 to release the latch and cause the desired sudden and violent movement of the parts from the position of FIG. 1 to that of FIG. 2.

An alternate connection of the auxiliary spring assembly of FIGS. 7 and 8 to the main snare cable and snare housing assembly of FIGS. 1-3 is shown in FIGS. 10 and 11. A supporting unit 141 shown in FIG. 11 includes a supporting post 142 adapted to be driven into the ground 143 at some location near a presumed animal path. The supporting unit includes a horizontal tubular arm 144 carried by a vertical tubular support section 146, which can slide up and down the supporting post 142 and be held at a desired height by a threaded locking member 147. A further horizontal supporting tube portion 148 slides over the portion 144 and may be extended or retracted and held in desired position by another locking member 149. The supporting unit has a snare housing support 150 at its outer end with a releasable latch connection for holding the snare housing assembly 27 initially above the ground with the snare loop 23 hanging below the snare housing. The releasable latch connection is designed to engage a flange 151 on the snare housing 127. Flange 151 also serves as a convenient gripping member for holding the body portion of the snare housing assembly while compressing the slide member 42 with respect thereto. In FIG. 11, a vertically movable latch pin 152 passes through an opening in flange 151 of the snare assembly and can be retracted against the urging of spring 153 on the support unit by means of downward force on the inner end 154 of latch 152. For this purpose, a latch plate 156 is threaded at a desired adjusted position on the lower end 161 of a vertically movable pin 157 which is urged downwardly by spring 158 within a tubular latch housing 159 on the supporting unit. Pin 157 is held in its upper preset position, with spring 158 compressed, by engagement of the lower end 161 against the top 162 of a vertically extending movable actuating arm having a ball-shaped bearing portion 163 permitting angular movement of the upper end 162 in any direction out from under the lower pin end 161 when the actuating arm is moved. The actuating arm has a downwardly extending portion 164 projecting into the path of any animal passing through the snare loop 23. This actuating arm 164 may have a rubber or plastic sleeve 166 thereon for camouflage or other purposes. The ball portion 163 of the actuating arm is supported for swinging movement between two threaded bearing members 167 which are carried by the supporting unit tubular housing 159 and which have partially spherical bearing ends to engage the ball 163.

The vertically movable member 157 serves as an intermediate operating member for engagement at 172 with the tripping element of the auxiliary spring assembly, which is selectively mounted in this application of the invention at the upper end of the snare housing 27, rather than being used as a ground trigger itself. For this purpose, the auxiliary spring assembly 91 has a cylindrical projection 168 designed to be received within the upper end of the tubular opening in the center of the slide member 42 of the snare housing. These parts can be assembled when the slide member 42 is in the extended position of FIG. 2, at which point the projection 168 can be inserted and a cross pin 171 can pass through aligned openings in the projection 168 and the slide member.

In this form of the invention, the winding drum of the auxiliary spring assembly is designed to be connected directly to the second end 24 of the main snare cable, rather than to an auxiliary cable 132 as in FIG. 6. For this purpose, the locking nut 36 and setscrew 37 of FIG. 1 can be removed readily from the end 22, and this end can then be inserted through the opening 111 in the side of the spring assembly casing 92. Thus, the end 22 of the snare cable 23 can be pushed through the casing opening and through the slot 116 in the winding drum and into engagement with a locking nut 117 and setscrew 118 as shown in FIG. 11 to effectively connect the second end of the snare cable to the winding drum of the auxiliarly spring assembly. This connection is made when the spring 99 is fully tensioned as in FIG. 11. The relative arrangement of the supporting unit and its parts is such that the end 172 of the intermediate operating member 157 is close to the tripping element or plate 128, and is in a position to move that plate and retract the latch 122 when the movable actuating element 164 is engaged by an animal and tilted out from under the threaded end 161 to permit spring-urged downward movement of operating member 157. This downward movement will first trip the auxiliary spring device so that snare end 22 is wound rapidly on the drum in time to initially pretighten the snare loop 23 around the animal which has engaged element 164. Almost immediately thereafter, the snare housing 27 will be released from the supporting unit 141, so that it will be completely free for its one-way sliding movement along the snare cable anchor portion and away from the anchor point of the first end of the snare cable. Thus, the snare housing assembly and snare cable will operate in the normal self-tightening fashion as previously described, as the animal tries to pull away. For this application of the invention, it is important that the second end 22 of the snare cable has the one-way clutch connection with the slide member 42 which has already been shown at 38, 39 in FIGS. 1 and 2. In effect, the connection of second end 22 of the snare cable to the winding drum could place more of a strain on that drum and the rest of the auxiliary spring assembly than they need to be designed for, were it not for the firm one-way connection of the snare end 22 directly with the slide member of the snare housing assembly by means of gripping member or clutch 38. Member 38 thus permits the initial tightening of the snare loop 23 by operation of the auxiliary spring member, but engages the cable end firmly enough to produce the quick final tightening action when the progressive earlier self-tightening of the snare loop brings the animal into sufficient contact with trigger end 67.

The auxiliary spring assembly has accordingly been constructed in a manner providing two forms of connecting elements for connection to the main snare cable. In the form shown in FIG. 6, the auxiliary cable 132 serves as a connecting element which can be connected to the snare cable loop portion 23 by arranging the two cables to form a combined snare loop. In the form shown in FIGS. 10 and 11, the projection 168 provides a rigid connection between auxiliary spring casing 92 and snare assembly slide 42, while winding drum slot 116 provides a direct connection to the main snare cable end 24. Such an auxiliary spring assembly can utilize a greater length of spring travel and a somewhat weaker spring force to provide a substantial preliminary decrease in snare loop size, in combination with a much greater spring force and shorter travel as used in the main snare housing assembly to provide the desired quick and forceful final tightening of the snare loop.

Thus, this auxiliary spring assembly provides a wider range of use, since a snare loop can be used which is large enough for the biggest animal expected along a path, but which will be rapidly tightened to fit any smaller animal which comes within the loop and triggers the trap.

Moreover, the auxiliary spring assembly provides a wider effective trigger area, compared to the limited area normally available within the jaws of a spring jaw trap. This area can be further increased by extending camouflaged sticks across the plates 123 and 128 to trigger them when an animal steps on a more remote part of such a stick.

The trap of this invention has the further advantage that it can provide a rapid killing effect by sudden strangulation or injection of a lethal drug. It can also make an animal unconscious by use of a nonlethal drug to assist in its capture within a desired time. The effective quick final tightening action of this trap also makes it unnecessary to anchor the free end of the snare loop to a strong enough object, to prevent the animal from dragging the trap away. Thus, the trap can be used in desert or barren areas where there are no convenient strong anchor points.

The foregoing specification sets forth certain preferred embodiments and modifications of the invention and some of the ways in which the invention may be put into practice, including the best mode presently contemplated for carrying out this invention. Modifications of the described embodiments, as well as alternate embodiments and devices for carrying out the invention, may also be apparent to those skilled in the art, within the spirit and scope of the following claims:

I claim:

1. An animal trap comprising a snare housing assembly for connection to a snare cable which has first and second ends with an anchor portion at the first end and a snare portion at the second end, the assembly including a snare housing having a guide passage for sliding connection of the housing on the anchor portion of the cable, the snare housing also having a connection for the second end of the cable and thereby providing a snare loop in the cable between said second end connection and said guide passage with the snare housing serving as a slip knot during normal self-tightening of the snare, the snare housing also having a settable and releasable spring member movably mounted thereon together with mechanism for operatively connecting the spring member to the snare cable for quick tightening of the snare loop in response to release of the spring member, and said trap having a trigger device operatively connected to the spring member for releasing the spring member in response to actuation of the trigger by an animal.

2. An animal trap according to claim 1 in which the snare housing assembly includes an injection needle projecting in a direction to penetrate part of an animal caught within the snare loop, a container for injection fluid, and pumping mechanism on the snare housing assembly operatively connected to the spring member for pumping injection fluid from the container through the needle in response to release of the spring member.

3. An improved animal trap comprising a snare cable having first and second ends with an anchor portion at the first end and a snare portion at the second end, a snare housing slidably mounted on the snare cable for normal relative one-way sliding movement along the snare cable in a direction away from the first end, the snare cable having its second end connected to the snare housing and its snare portion providing a snare loop adjacent the housing, the sliding movement of the housing along the cable serving as a slip knot and providing a normal self-tightening of the snare loop in response to pulling of the snare loop and housing away from the first end by an animal initially caught within the loop, said snare housing having a settable and releasable spring member movably mounted thereon and operatively connected between the snare cable and housing for quick and forceful final tightening of the snare loop in response to release of the spring member, and a trigger device mounted on the snare housing and operatively connected to the spring member for releasing the spring member upon engagement of the trigger device against the animal in response to such normal self-tightening of the loop.

4. An animal trap according to claim 3 in which said snare housing includes a housing body member and a slide member relatively movable thereon between a preset position and a released position, said spring member being connected between said slide member and body member and being compressed when the slide member is moved to preset position and normally urging the slide member from its preset toward its released position, said trigger device having a latch portion releasably holding the slide member in its preset position, and one of said housing body and slide members having a gripping member engaging the snare cable and causing the quick final tightening of the snare loop in response to movement of the slide member from preset to released position.

5. An animal trap according to claim 4, in which the trigger device includes a trigger member mounted on one of the housing body and slide members for limited relative longitudinal movement thereon toward and away from the snare loop, said trigger member having a trigger end projecting into the space within the snare loop and relatively movable away from the loop and toward the first cable end when engaged by an animal part during normal tightening of the loop, the trigger device also including a latch portion on one of the slide and housing body members movable between slide holding and slide releasing positions, and interengaging cam means on the trigger member and latch member moving the latch member to releasing position in response to the limited relative movement of the trigger member toward the first cable end.

6. An animal trap according to claim 5 in which the trigger end includes a hollow needle for injection of fluid into an animal part during final tightening of the snare loop, one of the housing body, slide and trigger members having a fluid container portion connected to the needle, and pumping mechanism responsive to movement of one of said members for pumping fluid from the container portion to the needle during relative movement of the slide member from preset to released position.

7. An animal trap according to claim 6 having the slide member mounted for relative movement from preset to released position in a direction away from the snare loop and toward the first cable end, the slide member having the fluid container portion and providing a longitudinal fluid chamber of uniform cross-section, the trigger member having a plunger of similar cross-section fitting within the chamber for relative pumping movement therein as the container portion and slide member move away from the snare loop and trigger member, and said trigger member having a fluid passageway from the plunger to the needle.

8. An animal trap according to claim 6 in which the hollow-needle trigger end has a releasable connection to the trigger member comprising a readily manually operable releasing portion at a location conveniently accessible externally of the snare housing for convenient selective replacement of one needle by another trigger end.

9. An animal trap according to claim 4 said housing body member having two parallel guide passages through which the respective portions of the snare cable extend from the snare loop toward the first end, said slide member being urged away from said snare loop and toward said first end as the slide member moves from preset to released position, said gripping member being mounted on the slide member and having one-way gripping engagement with the anchor portion of the snare cable in a direction providing free relative sliding movement of the slide member and housing body member along the anchor portion toward the snare loop for normal tightening of the loop, said gripping member engaging the snare cable anchor portion and pulling it with the slide member away from the snare loop for final tightening of the snare loop, and said slide member also having a connecting member engaging the second end of the snare cable and pulling said second end with the slide member away from the snare loop for more complete final tightening of the snare loop.

10. An animal trap according to claim 9 in combination with an auxiliary spring assembly, said auxiliary spring assembly comprising a casing, a winding drum rotatable on the casing between a tensioned position and a released position, an auxiliary spring connected to the drum and normally urging it from tensioned to released position, a releasable latch element for holding the drum in tensioned position, and a movable tripping element connected to release the latch and drum in response to movement of the tripping device, and said auxiliary spring assembly having a connecting element for connection to the snare cable for substantially decreasing the effective size of the snare loop in response to movement of the tripping element of the auxiliary spring assembly.

11. An animal trap combination according to claim 10 in which the connecting element of the auxiliary spring assembly includes an auxiliary cable having at least one end secured to the winding drum, said auxiliary cable being intertwined with the snare loop portion of the snare cable for preliminary snaring of an animal within the intertwined portions of the auxiliary cable and snare loop in response to movement of the tripping element of the auxiliary spring assembly.

12. An animal trap according to claim 10 in which the connecting member for the second snare cable end comprises a one-way clutch member on the slide member which provides free relative movement of the second end with respect to the slide member only in a direction away from the snare loop, the casing of the auxiliary spring assembly having a mounting portion supporting the auxiliary spring assembly on the slide member of the snare housing with the winding drum adjacent the second snare cable end, and the connecting element of the auxiliary spring assembly comprising a connecting device for attachment of the second snare cable end to the winding drum and thereby preliminarily winding the second snare cable end on the drum and substantially decreasing the snare loop size in response to movement of the tripping element and rotation of the drum to its released position.

13. An animal trap according to claim 12 in which the mounting portion of the auxiliary spring assembly and the connecting device for the winding drum have readily releasable connections for selective connection and removal of the spring assembly and drum with respect to the slide member and second snare cable end.

14. An animal trap according to claim 12 having a supporting unit for positioning the trap at a desired ground location, the supporting unit having a releasable latch connection for holding the snare housing initially above the ground with the snare loop hanging below the snare housing and across a presumed animal ground path, the supporting unit having a movable actuating arm projecting into said path for engagement by an animal passing through the snare loop, and the supporting unit also having an intermediate operating member engaging the tripping element of the auxiliary spring assembly and the releasable latch connection of the supporting unit for actuating the auxiliary spring assembly and releasing the snare housing from the supporting unit in response to such engagement of the movable actuating arm.

* * * * *